US008928816B2

(12) United States Patent
Fahn et al.

(10) Patent No.: US 8,928,816 B2
(45) Date of Patent: Jan. 6, 2015

(54) ACTIVITY RECOGNITION METHOD

(75) Inventors: Chin-Shyurng Fahn, Taipei (TW);
Shih-Min Liu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 379 days.

(21) Appl. No.: 13/551,706

(22) Filed: Jul. 18, 2012

(65) Prior Publication Data
US 2013/0182105 A1 Jul. 18, 2013

(30) Foreign Application Priority Data

Jan. 17, 2012 (TW) .............................. 101101696 A

(51) Int. Cl.
H04N 7/26 (2006.01)
G06K 9/46 (2006.01)
G06K 9/48 (2006.01)
G06K 9/62 (2006.01)

(52) U.S. Cl.
USPC ........... 348/701; 382/199; 382/203; 382/225; 382/226

(58) Field of Classification Search
USPC ................. 348/700, 701, 143, 135, 169, 170; 382/103, 107, 190, 195, 199, 203, 382/224–228, 173
See application file for complete search history.

(56) References Cited

U.S. PATENT DOCUMENTS

| 4,115,761 A * | 9/1978 | Ueda et al. ..................... 382/203 |
| 5,063,603 A * | 11/1991 | Burt .............................. 382/115 |
| 5,923,791 A * | 7/1999 | Hanna et al. .................. 382/295 |
| 6,108,446 A * | 8/2000 | Hoshen .......................... 382/225 |
| 6,295,380 B1 * | 9/2001 | Takahashi ..................... 382/240 |
| 6,307,964 B1 * | 10/2001 | Lin et al. ....................... 382/203 |
| 6,443,387 B1 * | 9/2002 | Mercer et al. .............. 242/532.3 |
| 6,804,398 B2 * | 10/2004 | Kaneko et al. ................ 382/190 |
| 6,859,554 B2 * | 2/2005 | Porikli et al. ................. 382/173 |
| 7,212,671 B2 * | 5/2007 | Kim et al. ..................... 382/190 |
| 8,229,249 B2 * | 7/2012 | Seki .............................. 382/291 |
| 8,280,170 B2 * | 10/2012 | Ooishi .......................... 382/195 |
| 8,300,892 B2 * | 10/2012 | Iwasaki et al. ................ 382/103 |
| 2004/0207656 A1 * | 10/2004 | Lee et al. ...................... 345/723 |
| 2006/0045349 A1 * | 3/2006 | Yamamoto et al. ........... 382/190 |
| 2008/0031523 A1 * | 2/2008 | Kim et al. ..................... 382/203 |
| 2010/0027892 A1 * | 2/2010 | Guan et al. .................... 382/203 |

* cited by examiner

Primary Examiner — Victor Kostak
(74) Attorney, Agent, or Firm — Bacon & Thomas, PLLC

(57) ABSTRACT

An activity recognition method, for recognizing continuous activities of several moving objects in the foreground of a video, includes: capturing and processing a training video to get a contour of a moving object; extracting a minimum bounding box of the contour in order to get parameters then transfer to feature vectors; constructing a decision tree model based on support vector machines (SVMs), for classifying the activities of the moving object according to the parameter and the feature vector of the training video; capturing and processing a testing video to get other parameters and using several formulas to generate feature vectors, and executing an algorithm for recognizing the activities of several moving objects in the foreground of the testing video. Said feature vectors are transformed from the parameters that in the testing and training videos. Via above descriptions, the method can recognize activities of foreground objects in the testing video.

13 Claims, 10 Drawing Sheets

ACTIVITY RECOGNITION METHOD

BACKGROUND OF THE INVENTION (1) Field of the Invention

The invention relates to an activity recognition method, and especially relates to a method for recognizing human activities.

(2) Description of the Prior Art

As technology develops towards simplicity and aims to satisfy a user-friendly man-machine interface, the activity recognition method has emerged as a popular research technique. The activity recognition method owns many advantages: (1) decreasing number of keys and accessories required in the man-machine interface, and thus significantly reducing size and weight and enhancing convenience; (2) operating multiple instructions of the man-machine interface through effective combination of software, and further increasing flexibility, definitely superior to the traditional man-machine interface (such as mouse) which can only operate single instruction. Therefore, the activity recognition method has gradually become a humanity re-evolution technology for future.

The activity recognition method can be applied in the innovation of game software to provide hand-foot interactive fun for players. Thus, the method can be widely used in consumer electronics, outdoor electronic billboards, store windows, and exhibition hall, etc. In addition, with population aging in Taiwan, the activity recognition method will also play an essential role in the applications of automatic monitoring systems, man-machine interfaces, home care systems and smart home surveillance.

Since human activity is composed of a series of continuous positions, and each activity contains movements of many body parts. Therefore, effective recognition of an activity requires high dimensional and very complex calculation and analysis, which brings difficulties to the activity recognition method. In addition, when capturing activities of a moving object in the foreground of a video by video processing, we should consider time and space information in each frame of the video. If two or more moving objects appear in the video, it is an urgent issue in the field to identify them, assign individual identification and recognize individual activity.

SUMMARY OF THE INVENTION

The object of the invention is to provide a method for recognizing plural activities of one foreground moving object or activities of plural foreground moving objects in a video more effectively.

In one aspect, the invention provides an activity recognition method. The method comprises steps of: capturing a training video; constructing a decision tree model based on the training video, wherein the decision has a plurality of support vector machines (SVMs) for classifying the activities of a first foreground moving object according to feature vectors in the first SVM of the training video; capturing a testing video; and each of the support vector machines comparing several feature vectors of the testing video in sequence according to the decision tree model, to recognize an activity of a second foreground moving object of the testing video. For example, the activity may be running, walking, jumping, sitting, squatting or lying.

The steps of capturing the training video comprises: processing the training video to distinguish a first contour of the first foreground moving object from a first background of the training video; defining a first minimum bounding box for the first contour; calculating a first parameter according to the first minimum bounding box; and transforming the first parameter into a first feature vector. The steps of capturing the testing video comprises: processing the testing video to distinguish a second contour of the second foreground moving object from a second background of the testing video; defining a second minimum bounding box of the second contour; calculating a second parameter according to the second minimum bounding box, wherein the second parameter comprises a center value of the second minimum bounding box; and providing an algorithm to judge whether the second foreground moving object is the same as the first foreground moving object according to a trajectory in form of the center value varying with the time; and transforming the second parameter into a second feature vector.

In an embodiment, the training video or the testing video comprises a plurality of frames. The frames include a first frame, a second frame and a third frame, which appear in sequence in the training video or the testing video. The steps of processing the training video or the testing video comprise: providing an averaging background method to distinguish a temporary moving object from each of the first background and the second background; executing the averaging background method to calculate a first, absolute difference value between each of the three frames and the first frame respectively; providing a maximum variance between clusters method to generate a noisy moving object according to the first absolute difference value; and providing a logic operation to combine the temporary moving object and the noisy moving object into each of the first foreground moving object and the second foreground moving object. The steps of executing the averaging background method comprise: calculating a second absolute difference value between the first frame and the second frame, and a third absolute difference value between the second frame and the third frame respectively; providing an accumulation step for accumulating the second and the third absolute difference values in sequence to calculate an average value thereof, and for generating a number of accumulating times; judging whether the number of accumulating times reaches a threshold; and if yes, constructing a statistic model based on the second and the third absolute difference values.

The steps of combining the temporary moving object and the noisy moving object into each of the first foreground moving object and the second foreground moving object comprise: providing an erosion operation to remove noise pixels in one of the first foreground moving object and the second foreground moving object; providing an dilation operation to dilate one of the first foreground moving object and the second foreground moving object after removing the noise pixels thereof; and contouring one of the first foreground moving object and the second foreground moving object after the erosion operation and the dilation operation to generate one of the first contour and the second contour.

In an embodiment, the algorithm comprises steps of: initializing the second foreground moving object to create a buffer space with a variable; judging whether the variable is empty; if the variable is empty, setting the variable equal the center value of the second minimum bounding box; and assigning an identification (ID) to the second foreground moving object. If the variable is not empty, judging whether the variable in the buffer space is equal to the center value of the second minimum bounding box to determine if the second foreground moving object is moving or doing fixed-point activity. If the variable in the buffer space is equal to the center value of the second minimum bounding box, assigning the identification to the second foreground moving object, and recognizing the second foreground moving object is doing the fixed-point activity. If the variable in the buffer space is not equal to the center value of the second minimum bounding box, judging whether the absolute value of the center value subtracting the variable in the buffer space reaches a minimum value; if yes, resetting the variable in the buffer space as the center value and assigning the identification to the second foreground moving object; otherwise, executing the algorithm again to assign another identification.

In an embodiment, each of the first parameter and the second parameter comprises an initial value, a minimum width, a minimum height and a center value. Each of the first feature vector and the second feature vector comprises a ratio, a displacement value, a speed value and a delay value, and all of the ratio, the displacement value, the speed value and the delay value are calculated according to the initial value, the minimum width, the minimum height and the center value, Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE PREFERRED EMBODIMENTS

In the following detailed description of the preferred embodiments, references are made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of Component "A" facing Component "B" herein may contain the situations that Component "A" facing Component "B" directly or one or more additional components is between Component "A" and Component "B". Also, the description of Component "A" "adjacent to" Component "B" herein may contain the situations that Component "A" is directly "adjacent to" Component "B" or one or more additional components is between Component "A" and Component "B". Accordingly, the drawings and descriptions will be regarded as illustrative in nature and not as restrictive.

Figure 1:
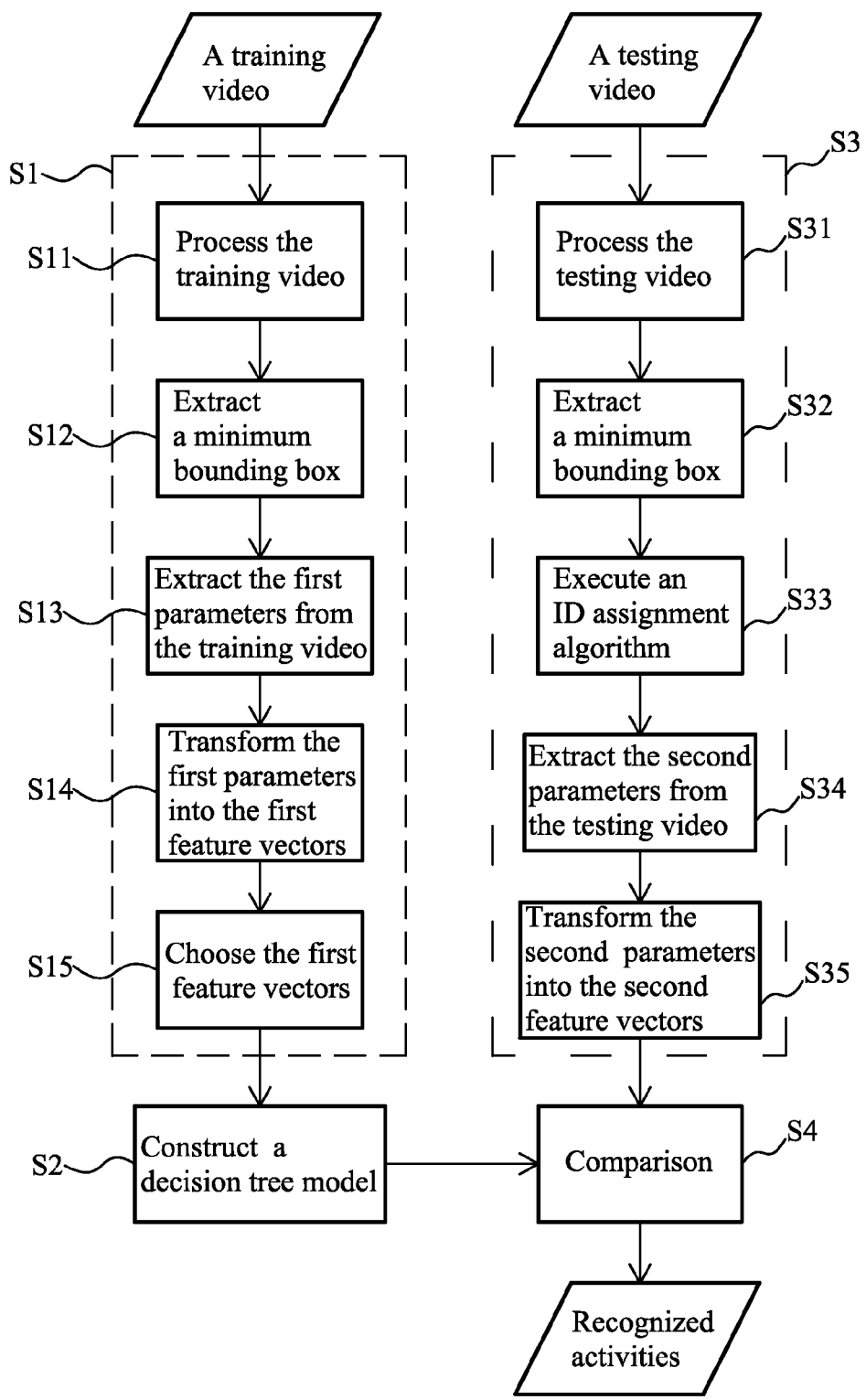
FIG. 1 is a flow chart of the activity recognition method in accordance with an embodiment of the present invention.

Refer to FIG. 1 which is a flow chart of the activity recognition method in accordance with an embodiment of the present invention. The activity recognition method includes steps of preliminary processing, capturing a minimum bounding box of a contour of a moving object in the foreground of a video, assigning identification (ID) to the moving object, transforming parameters of the video to feature vectors, constructing a decision tree model based on support vector machines (SVMs), and recognizing activities. Here are detailed steps:

S1: First, capturing a training video to do preliminary processing, including steps from S11 to S15:

S11: processing the training video to distinguish a contour of a foreground moving object from a background in the training video, where the foreground moving object has a plurality of activities. The detailed processing method will be described in S110 to S117 in FIG. 3 later.

Figure 2:
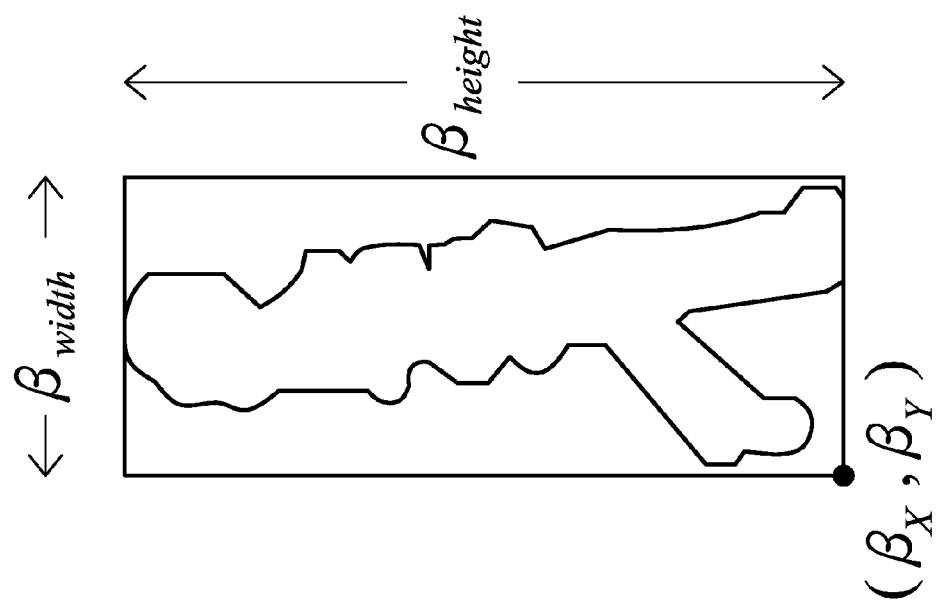
FIG. 2 is a schematic view showing a minimum bounding box of a contour of a moving object in the foreground in accordance with an embodiment of the present invention.

S12: extracting a minimum bounding box ($\beta$) of the contour from the foreground moving object of the training video, which has a minimum width $\beta_{width}$ and a minimum height $\beta_{height}$, as shown in FIG. 2.

S13: calculating a first parameter according to the minimum bounding box. The first parameter includes the minimum width $\beta_{width}$, the minimum height $\beta_{height}$, and also an initial value ($\beta_x$, $\beta_y$). Based on the initial value ($\beta_x$, $\beta_y$), the minimum width $\beta_{width}$ and the minimum height $\beta_{height}$, we can get a center value (Centroid$_x$, Centroid$_y$):

Centroid$_x$=$\beta_x$+($\beta_{width}$/2)

Centroid$_y$=$\beta_y$+($\beta_{height}$/2)

S14: transforming the first parameter into a first feature vector. In order to build a well-formed recognition structure, various kinds of parameters need to be collected from the training video and transformed into feature vectors, so as to construct the decision tree model based on support vector machines (SVMs). The first feature vector includes a ratio, a displacement value, and a speed value, and all of the ratio, the displacement value, and the speed value can be calculated based on the initial value ($\beta_x$, $\beta_y$), the minimum width $\beta_{width}$ and the minimum height $\beta_{height}$ of the minimum bounding box.

First of all, a ratio can be obtained from the minimum width $\beta_{width}$ and the minimum height $\beta_{height}$, and the ratio includes a Ratio$_{height}$ and a Ratio$_{width}$:

$Ratio_{width} = (\beta_{width} \times 2)/\beta_{height}$ $Ratio_{height} = (\beta_{height} \times 2)/\beta_{width}$ Since the moving objects have different heights and widths, based on the ratio, it is convenient to recognize multiple moving objects, and thus build a data base for each moving object.

After that, we can get a displacement value $Offset_x$ in the horizontal direction (X) and a displacement value $Offset_y$ in the vertical direction (Y) according to the center value ($Centroid_x$, $Centroid_y$):

$Offset_x = Centroid_x(T) - Centroid_x(T-1)$ $Offset_y = Centroid_y(T) - Centroid_y(T-1)$ Here $offset_x$ and $offset_y$ represent the displacement of the center in the X direction and the Y direction separately. The training video includes a plurality of frames, thus T stands for the time when each frame appears in the training video.

Besides that, we can get a velocity value $Velocity_x$ in the horizontal direction and a velocity value $Velocity_y$ in the vertical direction:

$Velocity_x = |(Centroid_x(l) - Centroid_x(l-10))/10|, l > m+10$ $Velocity_x = |(Centroid_x(l) - Centroid_x(m))/(l-m)|, l \geq m+10$ Here l means the $l^{th}$ frame at present, and m means the moving object enters the $m^{th}$ frame within the capture scope, and the formula of the velocity value $Velocity_x$ in the X direction refers to 10 frames captured in the training video to recognize activities "running" and "walking".

$Velocity_y = |(Centroid_y(l) - Centroid_y(l-3))/3|, l > m+3$ $Velocity_y = |(Centroid_y(l) - Centroid_y(m))/(l-m)|, l \geq m+3$ The above formula stands for $Velocity_y$ in the Y direction, because if the moving object in the foreground moves up and down, the time is quite short, so only 3 frames are captured from the training video for reference to avoid delay.

In addition, according to the displacement in the Y direction of the center value from the $l^{th}$ frame to the $m^{th}$ frame, we can get a vertical displacement $Disp_y$ of the moving object between the current $l^{th}$ frame to the $m^{th}$ frame.

$Disp_y = Centroid_y(l) - Centroid_y(m)$

S15: selecting the first feature vector, the embodiment of the present invention can also use a Hu moment containing $Humoments_2$ and $Humoments_4$, and the rotation angle $Theta_\beta$ of the ellipse approximation for recognizing activities.

S2: constructing a decision tree model including a plurality of support vector machines (SVMs), each of which classifies the activities of the moving object according to the first parameter and the first feature vector. Moreover, since the SVM is a binary classifier, it needs N*(N-1)/2 SVMs when the decision tree model is used for recognizing N kinds of activities. As for detailed implementation, it will be illustrated with reference to FIG. 6 thereafter.

S3: capturing a testing video, including S31 to S35:

S31: similar to S11, executing preliminary processing for the testing video, to distinguish a contour of a foreground moving object from a background in the testing video, S32: similar to S12 to S13, extracting a minimum bounding box (β) of the contour of the moving object in the testing video, further calculating a second parameter according to the minimum bounding box, where the second parameter includes a center value.

S33: for assigning an ID to the foreground moving object in the testing video, executing an algorithm to judge if the foreground moving object of the testing video is the same as that of the training video or not according to a trajectory which is in form of the center values varying with time.

S34: based on S32 to S33, getting the second parameter of the testing video for follow-up processing.

S35: similar to S14, transforming the second parameter to a second. feature vector.

S4: each SVM comparing the first feature vector in the training video and the second feature vector in the testing video according to the decision tree model, to recognize the activities of the foreground moving object in the testing video.

Figure 3:
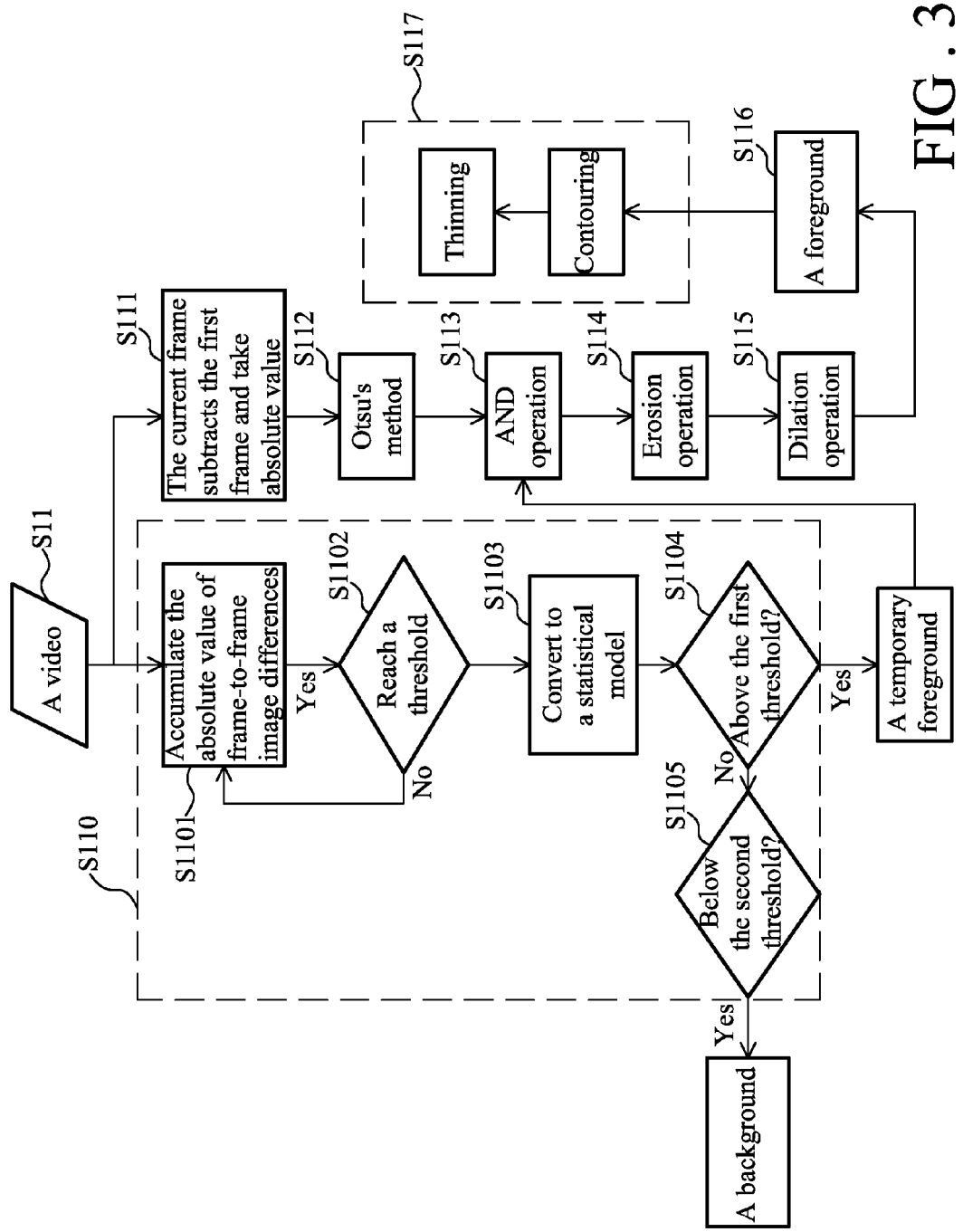
FIG. 3 is a flow chart of preliminary processing in accordance with an embodiment of the present invention.
Figure 3A:
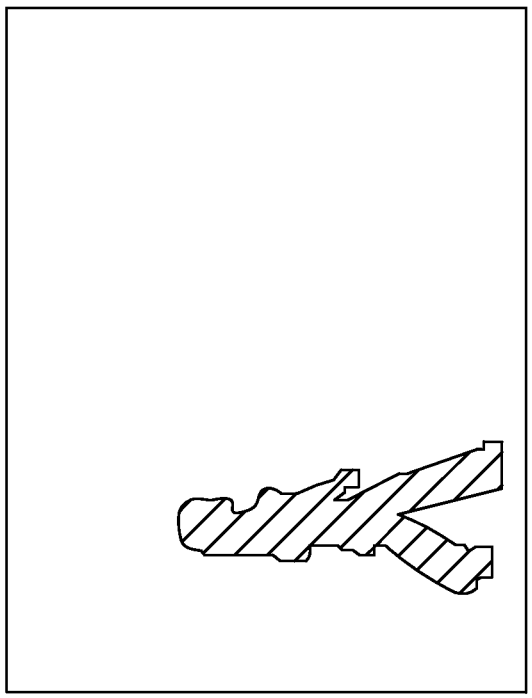
FIG. 3A is a schematic view of the foreground moving object comparison before and after erosion and dilation.
Figure 3A:
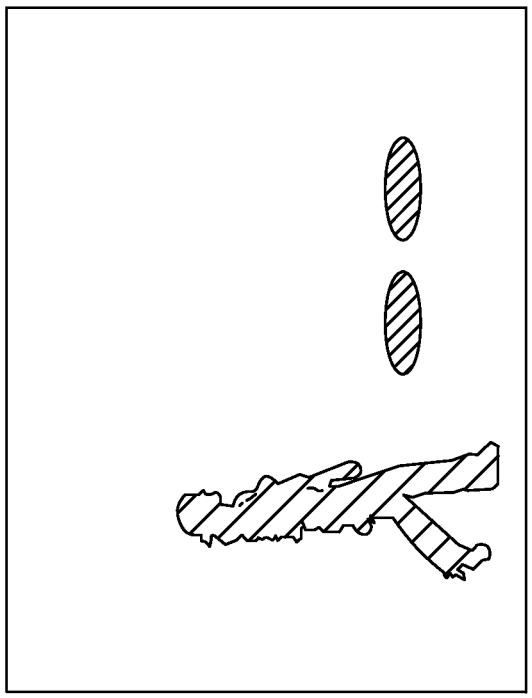
Figure 3B:
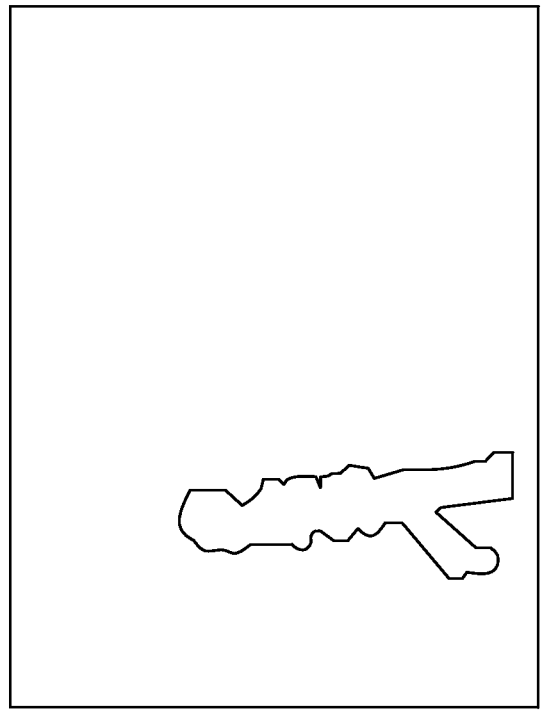
FIG. 3B is a schematic view of the foreground moving object before contouring and thinning.
Figure 3B:
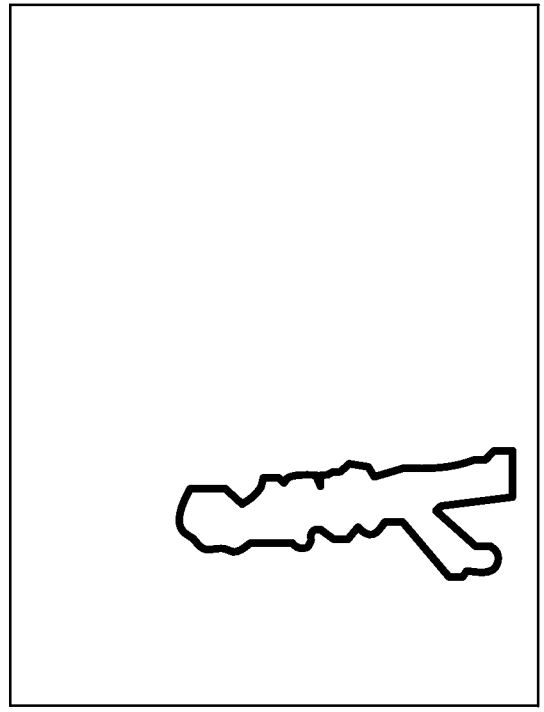

Refer to FIG. 3, FIG. 3A and FIG. 3B, which illustrate the preliminary processing method of S11 and S31 in details. The training video or the testing video includes a plurality of frames. The frames comprise a first frame, a second frame and a third frame. The first frame, the second frame and the third frame continuously appear in the training video or in the testing video in sequence. Steps of processing the training video or the testing video include:

S110: executing an averaging background method to distinguish a background and a temporary moving object in the foreground of the video; for example, the training video or the testing video.

S111: for the temporary moving object in the former step contains a shadow portion, the averaging background method combines a background subtraction method with a maximum variance between clusters method, which is called Otsu's Method. By means of the background subtraction method, a first absolute difference value between each frame is and the first frame can be calculated respectively.

S112: executing the maximum variance between clusters method to generate a noisy moving object based on the first absolute difference value, where the shadow portion of the foreground moving object is already completely removed, but the environmental noises such as the hole generated from the environment still exists.

S113: executing a logic operation to combine the temporary moving object in S110 and the noisy moving object in S113 into a final moving object, so as to get a complete foreground moving object, without being affected by the shadow portion and the environmental noises. Additionally, to capture the minimum bounding box of the contour of the moving object in S12, we take steps S114 to S117:

S114: executing an erosion operation to remove noise pixels in the moving object to prevent the hole in the moving object from affecting follow-up recognition.

S115: executing an dilation operation to dilate the moving object which already has noises removed for follow-up processing. A preferable embodiment executes the dilation operation for twice.

S116: after S114 to S115, the hole within the moving object is filled and the environmental noises are removed, the moving object becomes smooth and good for contouring, as shown in FIG. 3A, where FIG. 3A(a) is a frame of the moving object before erosion and dilation operations, and FIG. 3A(b) is after erosion and dilation operations.

S117: contouring the moving object to get a contour. To achieve preferable parameters, we use Sobel operator to get a contour of the moving object, then remain pixels of the edge of the contour through thinning, which is in favor of getting the minimum bounding box in S12, is as well as relevant feature vectors, where FIG. 3B(a) is the moving object before contouring. FIG. 3B(b) is the contour of the moving object after thinning.

The averaging background method in S110 includes steps of:

S1101: calculating a second absolute difference value between the first frame and the second frame, and a third absolute difference value between the second image and the third image respectively.

S1102: accumulating the second and the third absolute difference values in sequence to calculate an average value, where a number of accumulating times proceeds, and judging whether the number reaches a threshold.

S1103: if the number reaches a threshold, generating a statistic model based on the second and the third absolute difference values.

S1104: judging whether the average value is larger than a first threshold. If yes, extracting the temporary moving object of the video from the statistic model.

S1105: judging whether the average value is smaller than a second threshold. If yes, extracting the background of the video from the statistic model. According to S1104 and S1105, the background and the temporary moving object can be distinguished from each other.

Figure 4:
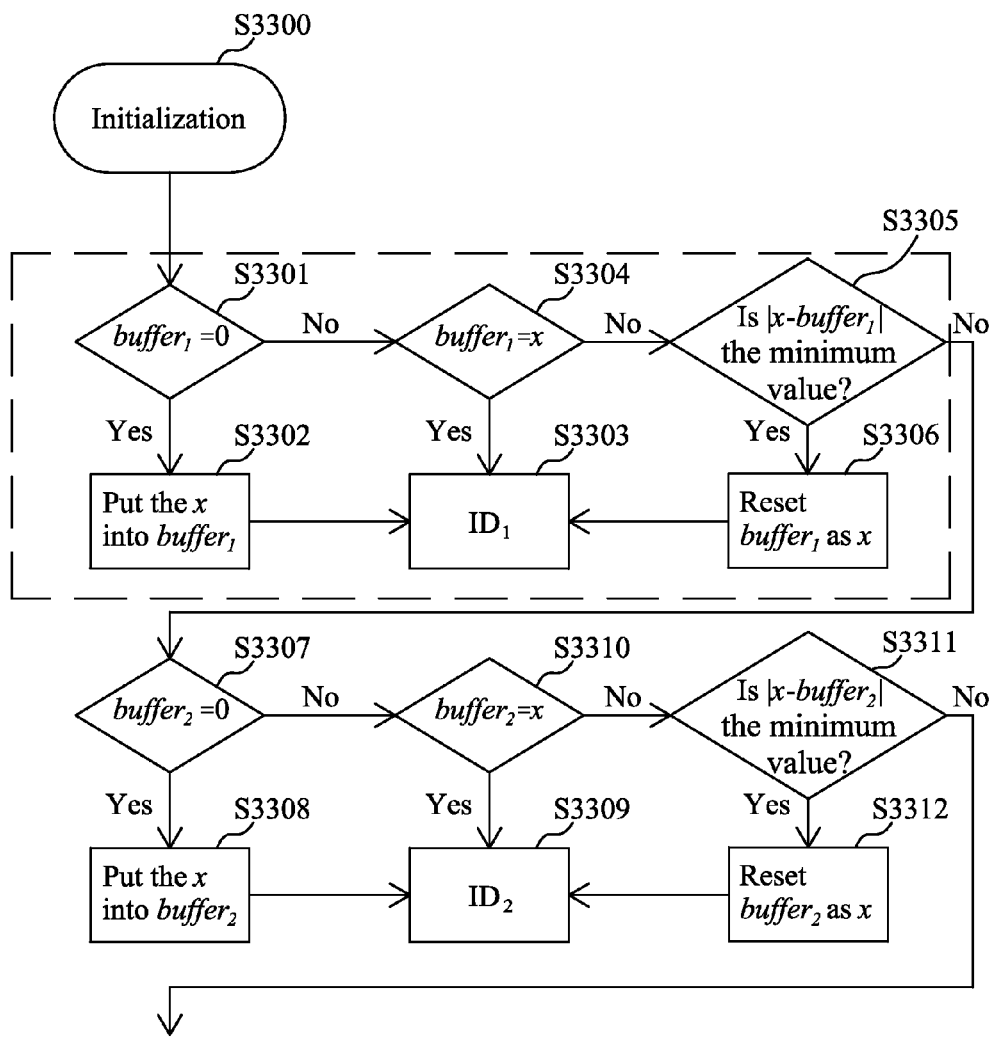
FIG. 4 is a flow chart of an ID assignment algorithm in accordance with an embodiment of the present invention.

Refer to FIG. 4 which is a flow chart of an ID assignment algorithm of S33 in FIG. 1. The ID assignment algorithm analyzes the trajectory which is in form of the center value variation of the minimum bounding box of the moving object with the time, to assign the ID to each moving object, including steps of:

S3300: First, initializing the foreground moving object to create a is first buffer space with a variable $buffer_1$.

S3301: judging whether the variable $buffer_1$ is empty after generating the center value of the minimum bounding box in S32 of FIG. 1.

S3302: if the variable $buffer_1$ is empty, setting the variable $buffer_1$ equal to the center value x.

S3303: assigning $ID_1$ to the moving object stored in the first buffer space,

S3304: If the variable $buffer_1$ in S3301 is not empty, checking whether the variable $buffer_1$ is equal to the center value x to judge whether the moving object is moving or doing fixed-point activity. If $buffer_1$=x, go back to S3303 and recognize ID of the moving object stored in the first buffer space to be $ID_1$ and the moving object is doing fixed-point activity.

S3305: If the variable $buffer_1$ is not equal to x, judging whether |x-$buffer_1$| reaches a minimum value. Hereby we can judge the distance between trajectories of the center value x and the variable $buffer_1$ is the shortest or not. If the trajectories are of the same ID, the distance is the shortest, so that we can simply determine the moving object of the testing video is the same as that of the training video or not, S3306: |x-$buffer_1$| reaches the minimum value, reset the variable $buffer_1$ as the center value x and return to S3303, and recognize ID of the moving object stored in the first buffer space to be $ID_1$.

S3307: Otherwise, going on with the judgment of the next ID, that is $ID_2$. Its steps from S3307 to S3312 are the same as from S3301 to S3306 for $ID_1$.

In the following description, the activity recognition method of the is present invention is used to recognize six types of human activities in a video: running, walking, jumping, sitting up and down, squatting up and down, and lying. The embodiment uses the decision tree model based on SVMs to recognize and capture activities of a single person as a training video to generate a first parameter and a first feature vector as training samples. Because the embodiment needs to recognize six kinds of activities, there must be five support vector machines $SVM_1$-$SVM_5$. Depending on each SVM with appropriate feature vectors, as well as all kinds of arrangements, we can get the suitable decision tree model and further recognition results.

Figure 5:
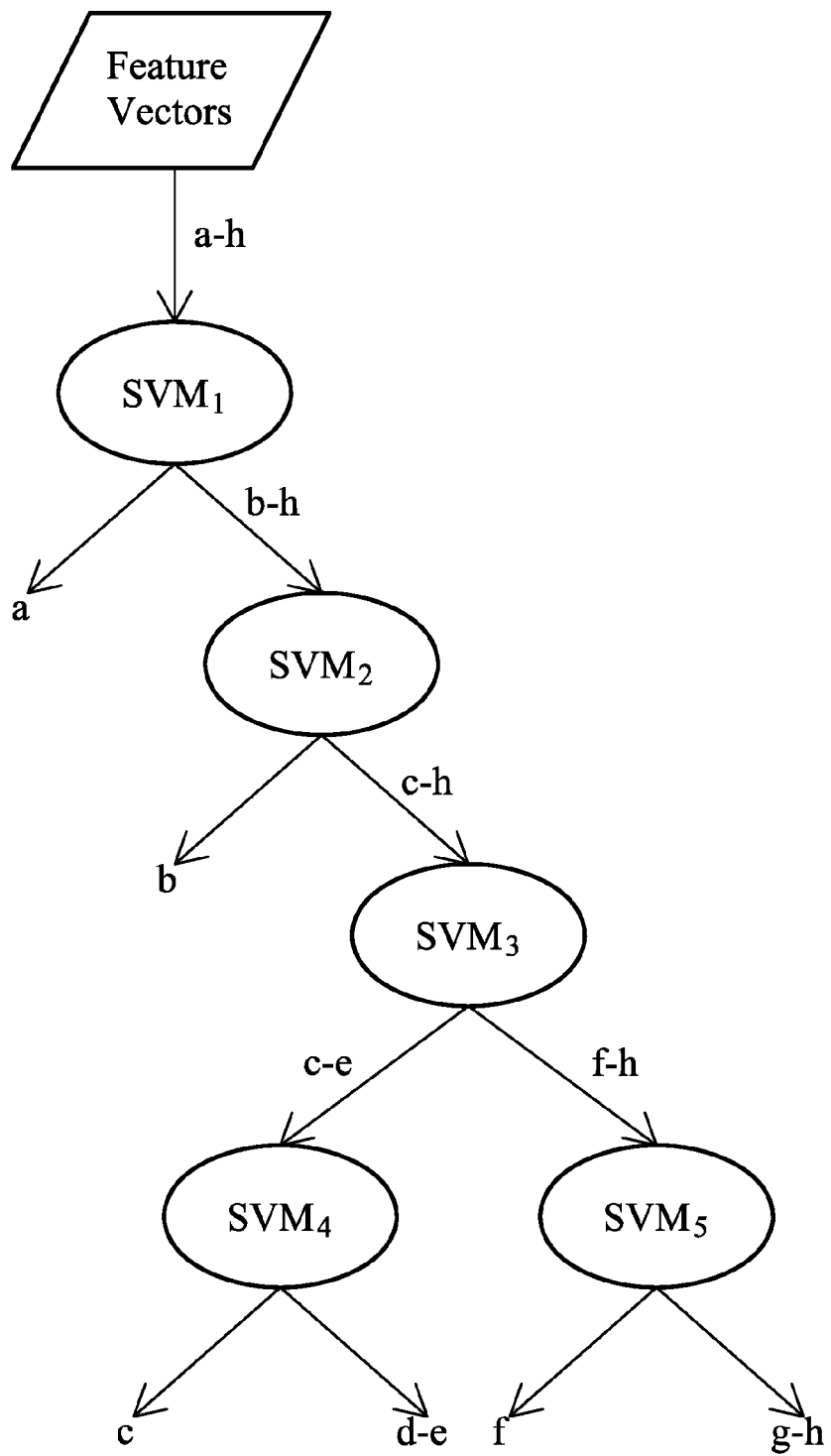
FIG. 5 is a schematic view of a decision tree model in an embodiment.
Figure 6:
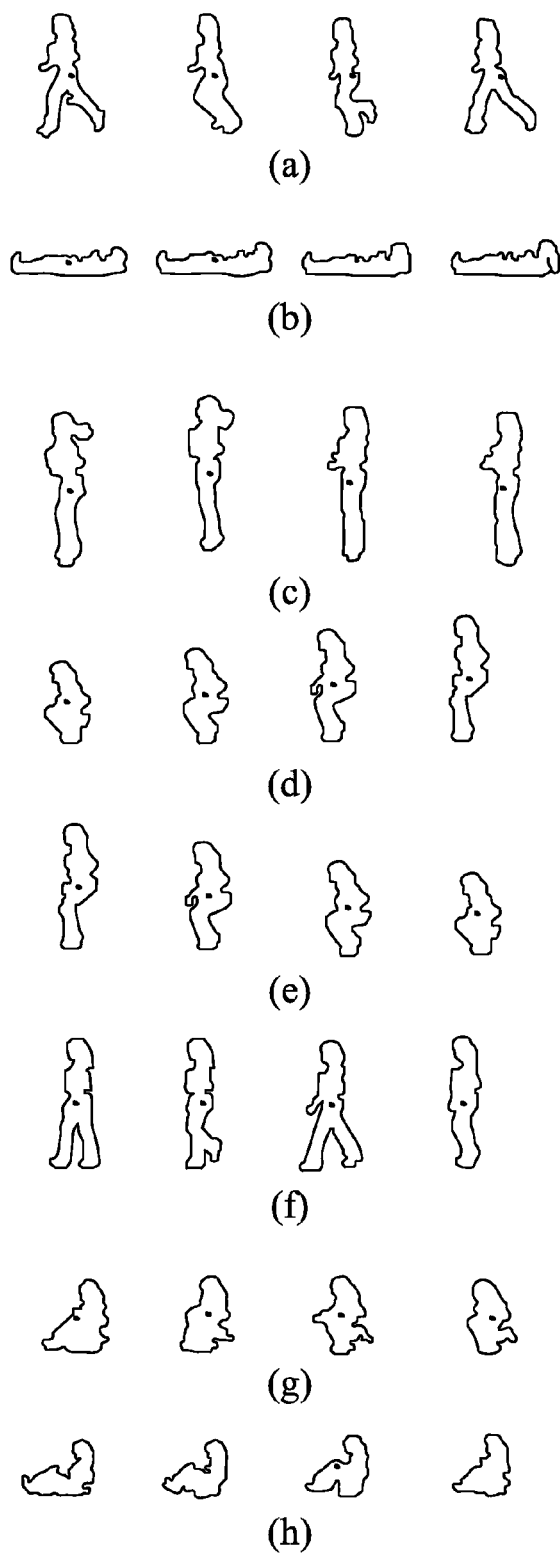
FIG. 6 is a schematic view of various action types in an embodiment.

Referring to FIG. 5, FIG. 6 and Table 1, $SVM_1$ uses $Velocity_x$ and $Offset_x$ in the horizontal direction to recognize running and other activities in FIG. 6(a); $SVM_2$ uses $Ratio_{width}$ and Hu moment ($Humoments_2$ and $Humoments_4$) to recognize lying and other activities in FIG. 6(b); $SVM_3$ uses $Disp_y$, $Velocity_y$ and $Offset_y$ in the vertical direction to recognize jumping in FIG. 6(c) and squatting up in FIG. (g) and squatting down in FIG. 6(h); $SVM_4$ uses $Ratio_{height}$, $Disp_y$ and $Theta_\beta$ to recognize jumping and other activities in FIG. 6(e); $SVM_5$ uses $Ratio_{height}$ and $Disp_y$ to recognize walking and other activities in FIG. 6(f).

TABLE 1

Feature vectors of SVMs in the decision tree model

| SVM | $SVM_1$ | $SVM_2$ | $SVM_3$ | $SVM_4$ | $SVM_5$ |
|---|---|---|---|---|---|
| Feature Vector | $Velocity_x$ $Offset_x$ | $Ratio_{width}$ $Humoments_2$ $Humoments_4$ | $Disp_y$ $Offset_y$ $Velocity_y$ | $Ratio_{height}$ $Disp_y$ $Theta_\beta$ | $Ratio_{height}$ $Disp_y$ |

Figure 7:
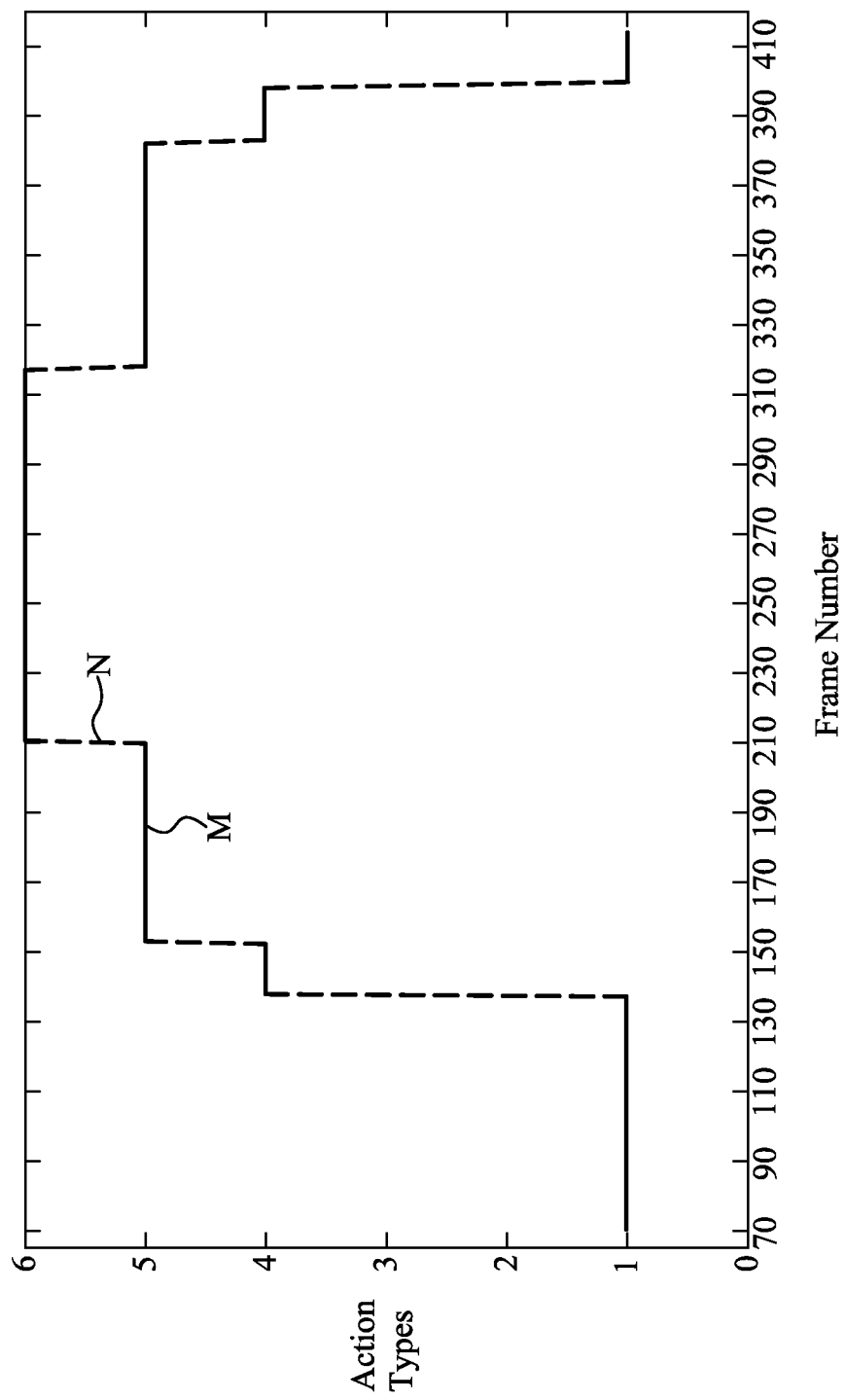
FIG. 7 is a curve of activity recognition results of a single moving object in an embodiment.

Referring to FIG. 7, it is a curve of the activity recognition result of a single moving object in the video according to the decision tree model. The horizontal axis stands for frame numbers, and the vertical axis is the action type in a number, 0 for no action; 1 for walking; 2 for running; 3 for jumping; 4 for squatting; 5 for sitting; 6 for lying. Curve M is the actual activity in the video, and Curve N is the recognized activity by the activity recognition method. A sequence of the activities of the moving object in the video is: walking, squatting down, sitting, lying, sitting, squatting up and walking. According to the figure, the activity sequence recognized by the activity recognition method is: 1 for walking, 4 for squatting, 5 for sitting, 6 for lying, 5 for sitting, 4 for squatting and 1 for walking.

Figure 8A:
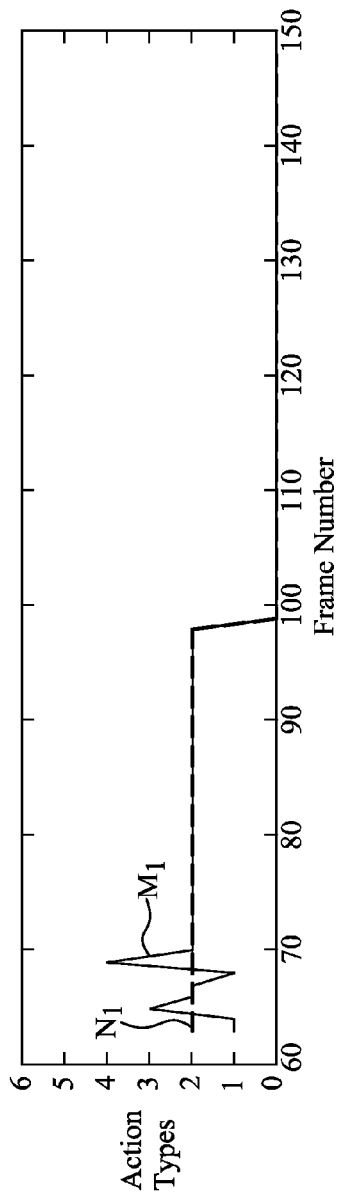
FIG. 8A to 8C are curves of activity recognition results of three moving objects in an embodiment.
Figure 8B:
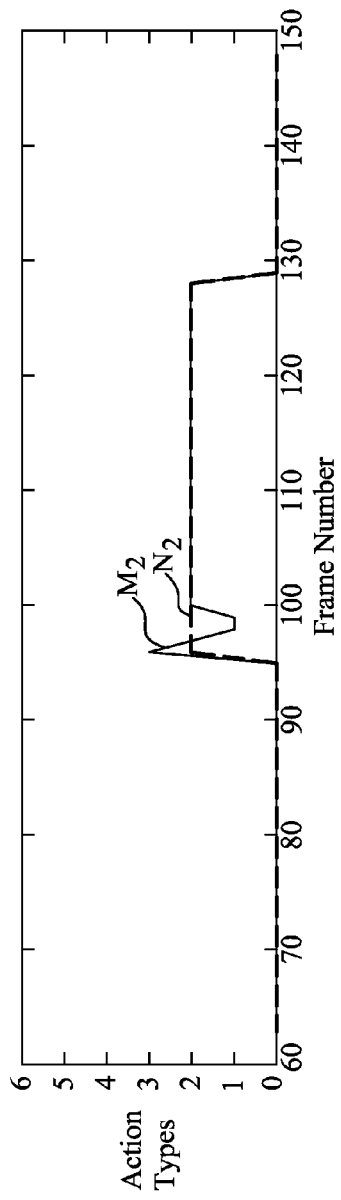
Figure 8C:
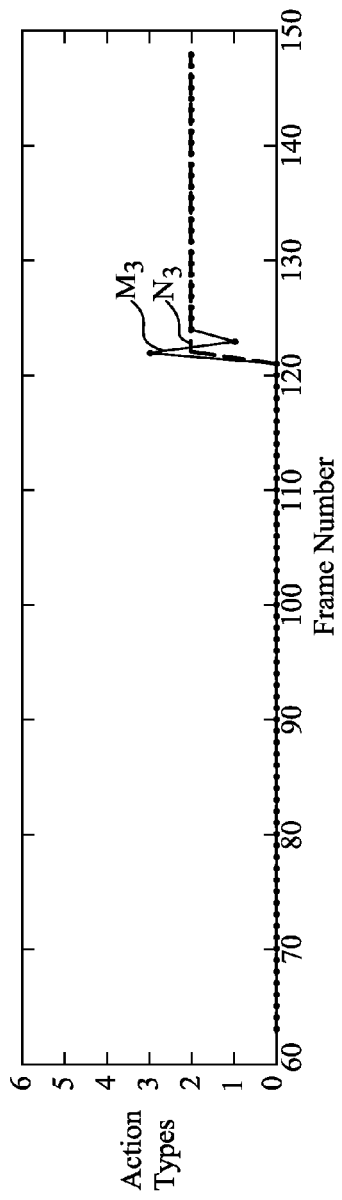

FIGS. 8A to 8C are the curves of activity recognition results of three moving objects in the video according to the decision tree model. The horizontal axis stands for frame numbers, and the vertical axis is the action type in a number as shown in FIG. 7. Curves $M_1$-$M_3$ are actual activities of the three moving objects in the video, and Curves $N_1$-$N_3$ are recognized activities by the activity recognition method. All three moving objects in the video are running, and enter the frames in sequence. It can be known from the frames that the activities are only misrecognized into other activities when the three moving objects enter the first 10 frames of the video; that is, from Frame 60 to Frame 70 in FIG. 8A, from Frame 90 to Frame 100 in FIG. 8B, and from Frame 120 to Frame 130 in FIG. 8C.

All in sum, the present invention provides an activity recognition method based on SVMs, and an ID assignment algorithm for recognizing continuous activities of several moving objects in the foreground of a video with a simple video capture system and calculator. Besides, the present invention can be applied in many fields, such as humanoid robotics, is smart home surveillance, digit game and nursing system. Using the activity recognition method of the present invention, the robot can recognize human's activities to perform the next action properly; as for smart home, when the owner is at work or leaving home, he can use a computer to check whether there is any suspicious person inside in a timely manner; as for digital games, the computer can judge player's activities so that the player can take a role in the game for all kinds of activities; as for nursing, in the current aging society, once recognizing the aged have any unsafe activities, caregivers can find and help in time.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustration rather than restriction. Obviously, many modifications and variations will be apparent to practitioners skilled in this art. The embodiments are chosen and described in order to best explain the principles of the invention and its best practical application mode, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art, without departing from the scope of the present invention as defined by the following claims. Moreover, no element and component in the present disclosure is intended to be dedicated to the public regardless of whether the element or component is explicitly recited in the following claims.

What is claimed is:

1. An activity recognition method, comprising steps of:
    capturing a training video having a first foreground moving object and a first background, wherein the first foreground moving object has a first contour, the steps of capturing the training video comprising:
        processing the training video to distinguish the first contour from the first background, wherein the first foreground moving object has a plurality of activities;
        defining a first minimum bounding box for the first contour;
        calculating a first parameter according to the first minimum bounding box; and
        transforming the first parameter into a first feature vector;
    constructing a decision tree model having a plurality of support vector machines (SVMs) for classifying the activities of the first foreground. moving object according to the first parameter and the first feature vector in one of the support vector machines;
    capturing a testing video having a second foreground moving object and. a second background, wherein the second foreground moving object has a second contour, the steps of capturing the testing video comprising:
        processing the testing video to distinguish the second contour from the second background;
        defining a second minimum bounding box of the second contour;
        calculating a second parameter according to the second minimum bounding box, wherein the second parameter comprises a center value of the second minimum bounding box;
        providing an algorithm to judge whether the second foreground moving object is the same as the first foreground moving object according to a trajectory in form of the center value varying with the time; and
        transforming the second parameter into a second feature vector; and
    each of the support vector machines comparing the first feature vector and the second feature vector in sequence according to the, decision tree model to recognize an activity of the second foreground moving object.

2. The activity recognition method of Mimi, wherein the training video comprises a plurality of frames including a first frame, a second frame and a third frame, which appear in sequence in the training video, the steps of processing the training video comprising:
    providing a temporary moving object in the training video;
    providing an averaging background method to distinguish the temporary moving object from each of the first background and the second background;
    executing the averaging background method to calculate a first absolute difference value between each of the three frames and the first frame respectively;
    providing a maximum variance between clusters method to generate a noisy moving object according to the first absolute difference value; and
    providing a logic operation to combine the temporary moving object and the noisy moving object into each of the first foreground moving object and the second foreground moving object.

3. The activity recognition method of claim 2, wherein the steps of executing the averaging background method comprise:
    calculating a second absolute difference value between the first frame and the second frame, and a third absolute difference value between the second frame and the third frame respectively;
    providing an accumulation step for accumulating the second and the third absolute difference values in sequence to calculate an average value thereof, and for generating a number of accumulating times;
    judging whether the number of accumulating times reaches a threshold; and
    if the number of accumulating times reaches a threshold, constructing a statistic model based on the second and the third absolute difference values.

4. The activity recognition method of claim 2, wherein each of the first foreground moving object and the second foreground moving object has a plurality of noise pixels, and the steps of providing the logic operation comprise:
    providing an erosion operation to remove the noise pixels in one of the first foreground moving object and the second foreground moving object;
    providing a dilation operation to dilate one of the first foreground moving object and the second foreground moving object after removing the noise pixels thereof; and
    contouring one of the first foreground moving object and the second foreground moving object after the erosion operation and the dilation operation to generate one of the first contour and the second contour.

5. The activity recognition method of claim 1, wherein the testing video comprises a plurality of frames including a first frame, a second frame and a third frame, which appear in sequence in the testing video, the steps of processing the testing video comprising:
   providing a temporary moving object in the testing video;
   providing an averaging background method to distinguish the temporary moving object from each of the first background and the second background;
   executing the averaging background method to calculate a first absolute difference value between each of the three frames and the first frame respectively;
   providing a maximum variance between clusters method to generate a noisy moving object according to the first absolute difference value; and
   providing a logic operation to combine the temporary moving object and the noisy moving object into each of the first foreground moving object and the second foreground moving object.

6. The activity recognition method of claim 5, wherein the steps of executing the averaging background method comprise:
   calculating a second absolute difference value between the first frame and the second frame, and a third absolute difference value between the second frame and the third frame respectively;
   providing an accumulation step for accumulating the second and the third absolute difference values in sequence to calculate an average value thereof, and for generating a number of accumulating times;
   judging whether the number of accumulating times reaches a threshold; and
   if the number of accumulating times reaches a threshold, constructing a statistic model based on the second and the third absolute difference values.

7. The activity recognition method of claim 5, wherein each of the first foreground moving object and the second foreground moving object has a plurality of noise pixels, and the steps of providing the logic operation comprise:
   providing an erosion operation to remove the noise pixels in one of the first foreground moving object and the second foreground moving object;
   providing a dilation operation to dilate one of the first foreground moving object and the second foreground moving object after removing the noise pixels thereof; and
   contouring one of the first foreground moving object and the second foreground moving object after the erosion operation and the dilation operation to generate one of the first contour and the second contour.

8. The activity recognition method of claim 1, wherein the steps of providing the algorithm comprise:
   initializing the second foreground moving object to create a buffer space with an variable;
   judging whether the variable is empty;
   if the variable is empty, setting the variable equal to the center value of the second minimum bounding box; and
   assigning an identification to the second foreground moving object.

9. The activity recognition method of claim 8, wherein the step of judging whether the variable is empty comprises:
   if the variable is not empty, judging whether the variable in the buffer is space is equal to the center value of the second minimum bounding box to determine if the second foreground moving object is moving or doing fixed-point activity; and
   if the variable in the buffer space is equal to the center value of the second minimum bounding box, assigning the identification to the second foreground moving object, and recognizing the second foreground moving object is doing the fixed-point activity.

10. The activity recognition method of claim 9, wherein the step of judging whether the variable in the buffer space is equal to the center value of the second minimum bounding box comprises:
   if the variable in the buffer space is not equal to the center value of the second minimum bounding box, judging the absolute value of the center value subtracting the variable in the buffer space reaches a minimum value;
   if the absolute value of the center value subtracting the variable in the buffer space is equal to the minimum value, resetting the variable in the buffer space as the center value and assigning the identification to the second foreground moving object; and
   if the absolute value of the center value subtracting the variable in the buffer space is not equal to the minimum value, executing the algorithm again to assign another identification.

11. The activity recognition method of claim 1, wherein each of the first parameter and the second parameter comprises an initial value, a minimum width, a minimum height and a center value.

12. The activity recognition method of claim 11, wherein each of the first feature vector and the second feature vector comprises a ratio, a displacement value, a speed value and a delay value, and all of the ratio, the displacement value, the speed value and the delay value are calculated according to the initial value, the minimum width, the minimum height and the center value.

13. The activity recognition method of claim 12, wherein the activity of the second foreground moving is selected from the group consisting of running, walking, jumping, sitting, squatting and lying.

* * * * *